United States Patent [19]

Dundas et al.

[11] Patent Number: 5,604,567

[45] Date of Patent: Feb. 18, 1997

[54] PRINTER COLOR AND GRAY BALANCE ADJUSTMENT SYSTEM

[75] Inventors: Peter H. Dundas, Pittsford; Donald M. Temple, Williamson; Susan J. Zoltner, Webster, all of N.Y.

[73] Assignee: Xerox Corporation, Stamford, Conn.

[21] Appl. No.: 253,879

[22] Filed: Jun. 3, 1994

[51] Int. Cl.$^6$ .................................................. G03G 15/01
[52] U.S. Cl. ................................................ 399/39; 399/9
[58] Field of Search ................................. 355/326 R, 327, 355/208, 203, 209

[56] References Cited

U.S. PATENT DOCUMENTS

| | | | |
|---|---|---|---|
| 3,718,397 | 2/1973 | Smajo | 355/326 R X |
| 3,799,668 | 3/1974 | McVeigh | 355/326 X |
| 4,235,551 | 11/1980 | Harvey | 355/38 |
| 4,310,248 | 1/1982 | Meredith . | |
| 4,878,063 | 10/1989 | Katerberg | 346/1.1 |
| 4,959,669 | 9/1990 | Haneda et al. . | |
| 4,972,257 | 11/1990 | Birnbaum et al. | 358/80 |
| 5,012,299 | 4/1991 | Sawamura et al. | 355/326 R |
| 5,142,337 | 8/1992 | Karidis et al. | 355/326 R X |
| 5,184,183 | 2/1993 | Karidis et al. | 355/326 R X |
| 5,208,626 | 5/1993 | Tanimoto et al. | 355/208 X |
| 5,223,895 | 6/1993 | Saitoh | 355/209 X |
| 5,343,233 | 8/1994 | Abe | 355/326 R X |

FOREIGN PATENT DOCUMENTS

| | | |
|---|---|---|
| 0461810 | 12/1991 | European Pat. Off. . |
| 0582421 | 2/1994 | European Pat. Off. . |

OTHER PUBLICATIONS

Patent Abstracts of Japan. vol. 16. No. 475 (E–1273) Nov. 2, 1992 and JP–A–04170268 (Fuji Xerox) Jun. 17, 1992 Abstract.

The Dunn Report for Electronic Publishing & Prepress Systems, vol. VIII, No. 5, May, 1990, Vista, CA, USA pp. 1.25–29, Landmark Developments in Device Independent Color.

Primary Examiner—Nestor R. Ramirez

[57] ABSTRACT

An apparatus and method for adjusting color and gray balance in a color printer, wherein a multicolored output sheet including a set of printer color balance adjustment instructions for performing color balance adjustments processor is produced by the print engine. A processor provides a color balance judging indicator, from to a scanned test pattern sheet in the case of a copier or from a memory electronically storing a test image. A controller is used to for transmit the set of printer color and gray balance adjustments to the processor.

13 Claims, 12 Drawing Sheets

PRINTER COLOR AND GRAY BALANCE ADJUSTMENT SYSTEM

The present invention relates to a color and gray balance adjustment system for electrophotographic printers and copiers, and more particularly, to an apparatus and method for permitting users and technicians to perform color and gray balance procedures according to improved corrective procedures.

In the process of electrostatographic printing, an electrostatic charge pattern or latent image corresponding to an original or electronic document to be produced is recorded on an insulating medium. A viewable record is produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles must be supplied.

In the operation of an electrophotographic copier or printer, particularly color machines, it is highly desirable to have means for indicating and then adjusting the color and gray balance of the machine. Particularly in the case of a color printers, it is highly desirable that a user color and gray balance adjustments be enabled. Various printed or copied colors, to include pantone colors, may be monitored, and appropriate corrective actions taken by an operator to adjust machine color and gray balance. Selection of printer user preferences may be made, such as saturated solid areas, bold text and other image attributes. Measures to color and gray balance adjustments be enabled. Various printed or copied colors, to include pantone colors, may be monitored, and appropriate corrective actions taken by an operator to adjust machine color and gray balance. Selection of printer user preferences may be made, such as saturated solid areas, bold text and other image attributes. Measures to prevent print defects, improper density, and other undesirable conditions may be controlled or eliminated.

The following disclosures may be relevant to various aspects of the printer/copier service statusing system of the present invention:

U.S. Pat. No. 4,972,257 Patentee: Birnbaum et al Issued: Nov. 20, 1990

U.S. Pat. No. 4,878,063 Patentee: Katerberg Issued: Oct. 31, 1989

U.S. Pat. No. 4,235,551 Patentee: Harvey Issued: Nov. 25, 1980

U.S. Pat. No. 4,972,257 discloses an operator controllable apparatus which adjusts the color of a copy being reproduced from a multi-colored original document. The original document is scanned and a set of primary color densities in that document are measured. The measured set of primary color densities is changed to a set of colorimetric coordinates. The operator adjusts the set of colorimetric coordinates so that the copy has the desired hue, saturation and darkness. The operator adjusted set of colorimetric coordinates is converted to a set of cyan, magenta, and yellow densities used to form latent images. The latent images are developed with cyan, magenta, and yellow developer material, respectively. Thereafter, the developed images are transferred, in superimposed registration with one another, to a sheet and are fused to that sheet, resulting in an operator adjusted multicolor copy of the original document.

U.S. Pat. No. 4,878,063 discloses a method for detecting and correcting misregistration of color separation planes in multicolor printing. The method includes printing sets of test marks on a test sheets and visually inspecting the alignment of the marks.

U.S. Pat. No. 4,235,551 discloses a photographic printer including incremental correction buttons or keys to permit an operator to request and perform incremental color or overall density corrections. Preset keys permit operators to request a correction for a recognizable cause of off-balance prints. The preset correction keys represent the desired correction for recognizable causes which represent a combination of more than one incremental color or density correction.

In accordance with one aspect of the present invention, there is provided a printing system adapted to print multicolored indicia on sheets including a processor, responsive to receiving a set of printer color balance adjustments, for providing a color balance judging indicator and a controller for transmitting the set of printer color balance adjustments to the processor. The printing system also includes a print engine, associated with the processor, for printing a multicolored output sheet including a set of printer color balance adjustment instructions on performing color balance adjustments with the controller according to the color balance judging indicator.

In accordance with another aspect of the present invention, there is provided a method for adjusting color and gray of a printing system adapted to print multicolored indicia on sheets. The method includes the steps of obtaining a color balance judging indicator from a print engine and outputting a multicolored sheet from the print engine, with the multicolored sheet including a set of printer color balance adjustment instructions on performing color balance adjustments to the print engine. The method also includes the step of performing a set of printer color balance adjustments according to the set of printer color balance adjustment instructions.

Other features of the present invention will become apparent as the following description proceeds and upon reference to the drawings, in which:

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 12:
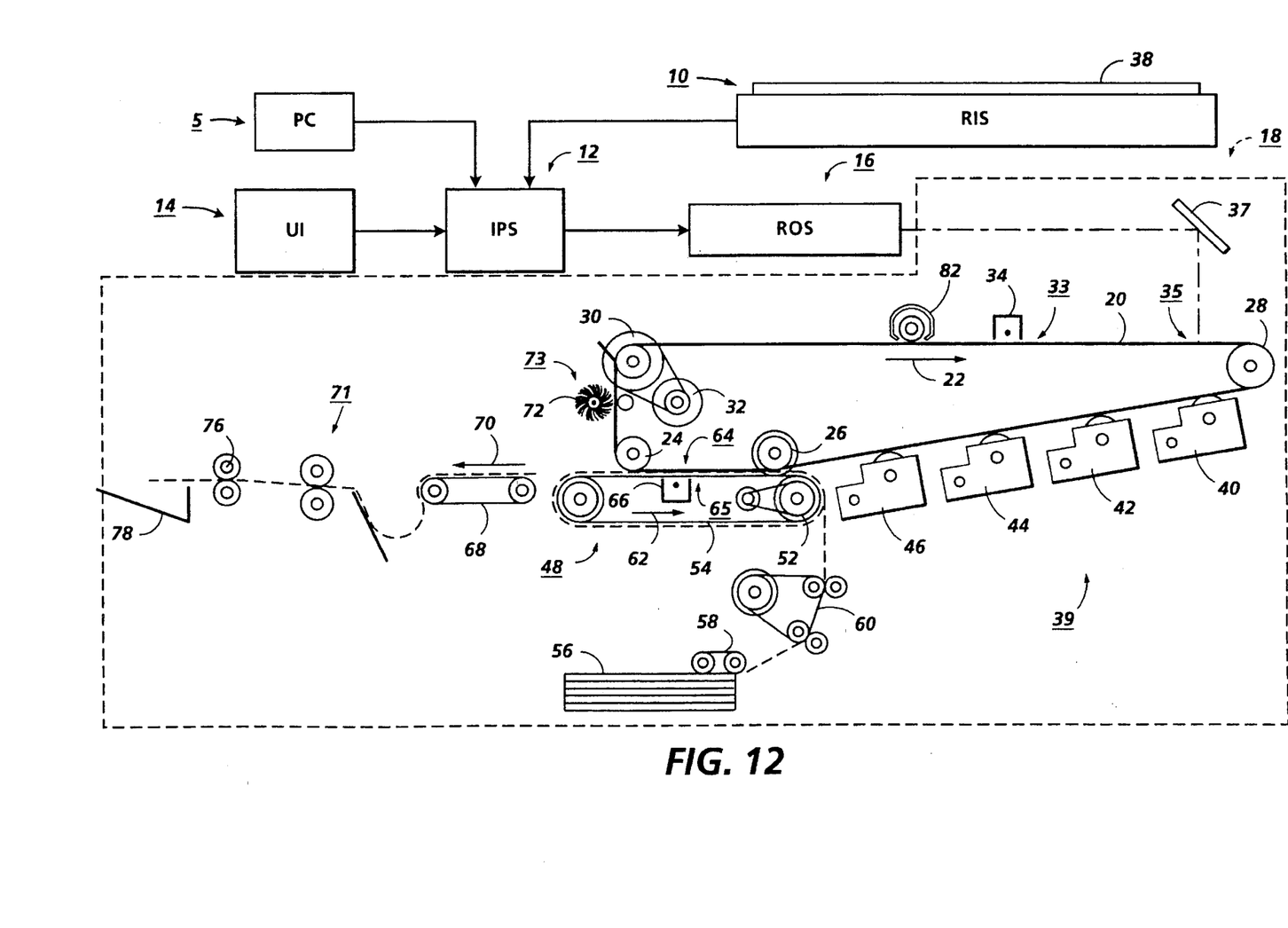
FIG. 12 is a schematic elevational view showing an exemplary color electrophotographic printing machine and networked PC incorporating features of the present invention therein.

For a general understanding of the features of the present invention, reference is made to the drawings. FIG. 12 is a schematic elevational view showing an exemplary electrophotographic printing machine and a networked PC which may incorporate features of the present invention therein. It will become evident from the following discussion that the system of the present invention is equally well suited for use in a wide variety of printing and copying systems, and therefore is not limited in application to the particular system(s) shown and described herein.

To begin by way of general explanation, FIG. 12 is a schematic elevational view showing an electrophotographic printing machine and networked PC which may incorporate features of the present invention therein. An image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 12), as well as display all or certain relevant procedures in accordance with the present invention as described in association with FIGS. 1 through 11 below.

Figure 8:
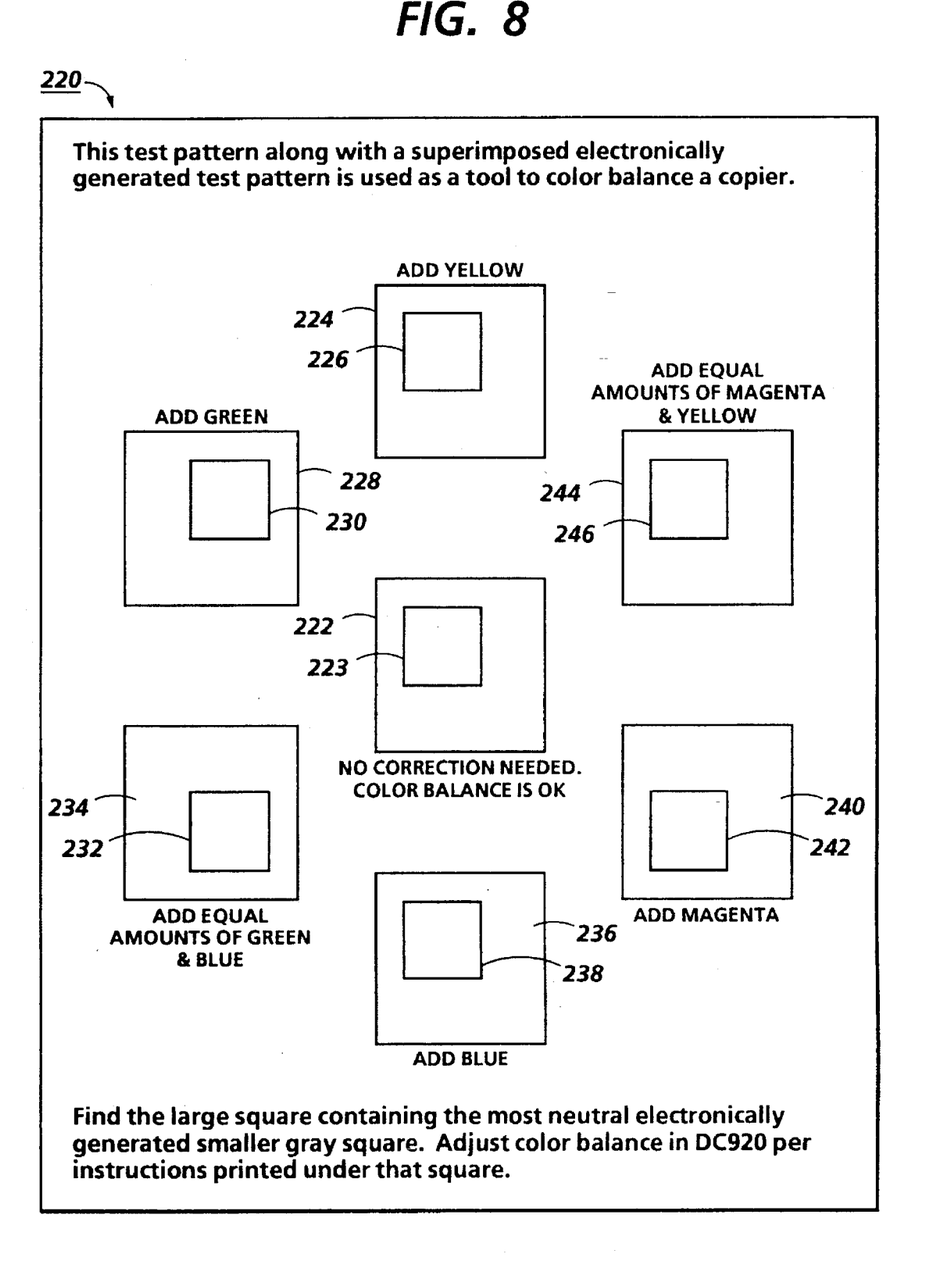
FIG. 8 is an elevational view showing a color balance test output copy of the present invention.

As further shown in FIG. 12, a multiple color original document 38 (or a test pattern sheet of the present invention as described and shown in FIG. 8) may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or (unlike as shown in FIG. 12) directly to PC 5.

Digitized electronic documents may be created, modified, stored and/or otherwise processed by PC 5 prior to transmission/relay to IPS 12 for printing on printer 18. The display of PC 5 may show electronic documents on a screen (not shown in FIG. 12). The screen of PC 5 may also display and interface with the IPS 12 processor(s) and controller(s), to include those for adjusting printer color and gray balance in accordance with the present invention as described in association with FIGS. 1 through 11 below. IPS 12 may include the processor(s) and controller(s) (not shown in FIG. 12) required to perform the printer color and gray balance indicating and manipulating procedures according to the printer color and gray balance adjustment system of the present invention.

IPS 12 also may transmits signals corresponding to the desired electronic or scanned image to ROS 16, which creates the output copy image. ROS 16 includes a laser with rotating polygon mirror blocks. Preferably, a nine facet polygon is used. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 12, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown in FIG. 12) extends between belts 54 and moves in unison therewith. A sheet 25 is advanced from a stack of sheets 56 disposed on a tray. A friction retard feeder 58 advances the uppermost sheet from stack 56 onto a pretransfer transport 60. Transport 60 advances the sheet (not shown in FIG. 12) to sheet transport 48. The sheet is advanced by transport 60 in synchronism with the movement of the sheet gripper. In this way, the leading edge of the sheet arrives at a preselected position or loading zone to be received by the open sheet gripper. The sheet gripper then closes securing the sheet thereto for movement therewith in a recirculating path. The leading edge of the sheet (again, not shown in FIG. 12) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 1:
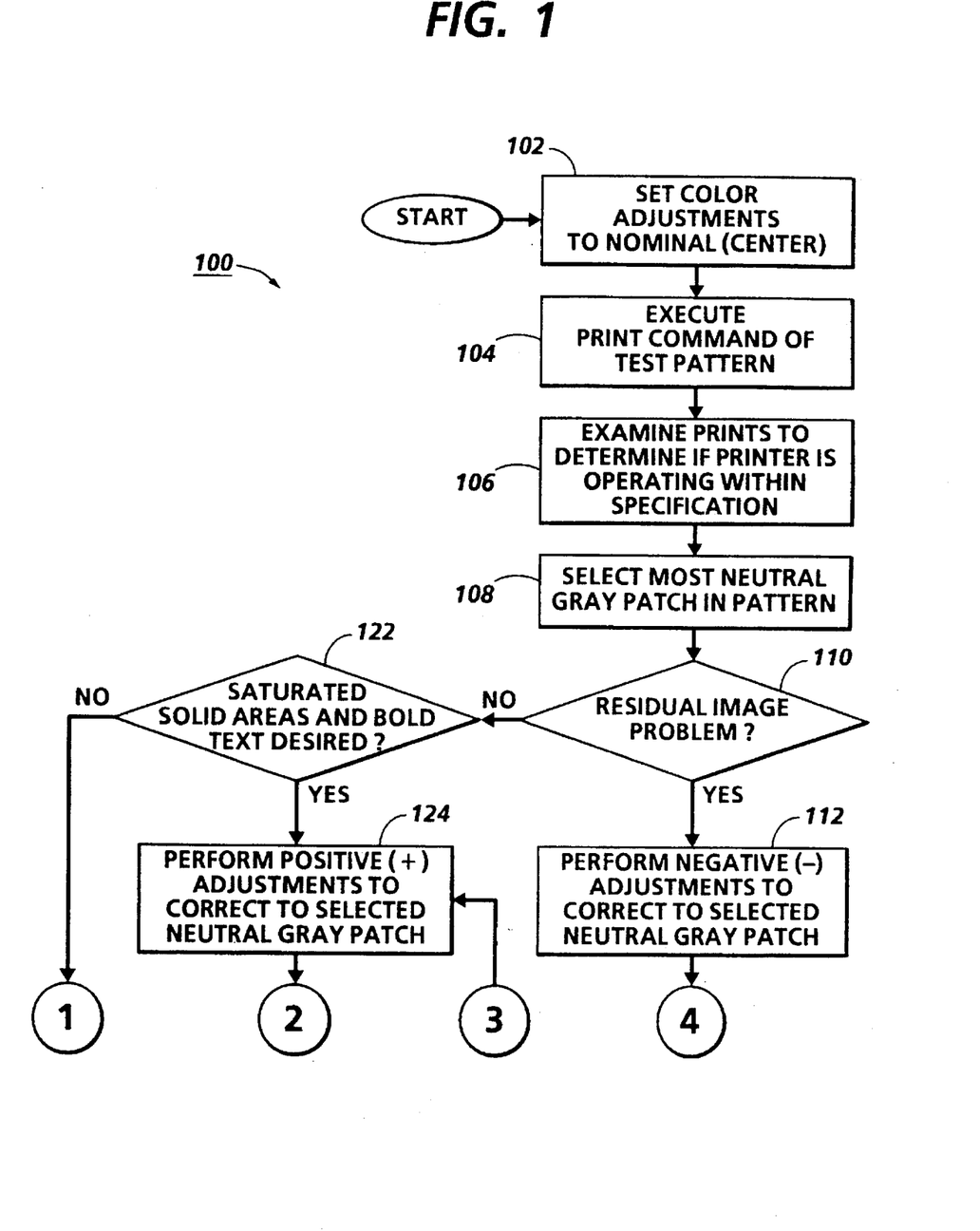
FIG. 1 is a flowchart showing one embodiment of a color balance system of the present invention.
Figure 5:
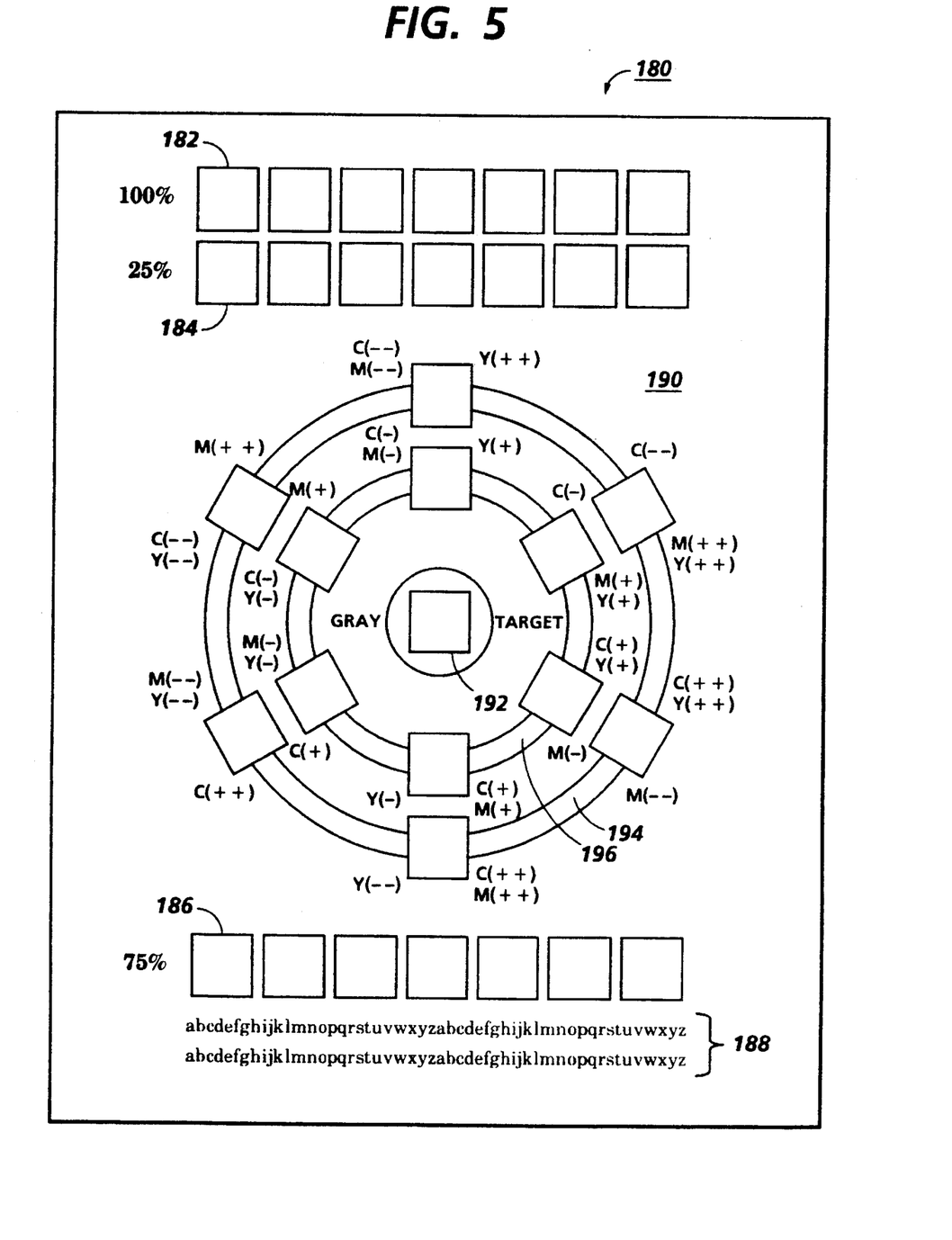
FIG. 5 is an elevational view showing a color balance test output print of the present invention.

FIGS. 1 through 5 show system 100 of the present invention for adjusting color and gray balance. With reference to FIG. 1, once system 100 is initiated according to block 102, all color adjustments are set (or reset) to nominal or center values so as to permit adjustment in both directions. According to block 104, a print command is initiated so as to print out a copy of the test pattern for evaluation. According to block 106, the test pattern of FIG. 5 is evaluated to determine if the printer is operating within specifications. The relative magnitude of any adjustments that may be required to the system may also be evident when the FIG. 5 test pattern is initiated. According to block 108, the "most neutral" gray patch in pattern 190 shown in FIG. 5 is selected. If a residual image problem does exist according to block 110, the negative adjustments to correct to the selected neutral gray patch are completed according to block 112. The negative color adjustments to correct to the selected neutral gray patch, shown on the FIG. 5 pattern 190 with "–" signs, are performed according to block 124. In each adjustment case based on FIG. 5, outer ring 194 corresponds to the need for higher order adjustments (such as the "(++)" or "(—)" indications), while inner ring 196 corresponds to the need for lower order adjustments (such as the "(+)" or "(–)" indications). Whenever "Gray Target" 192 is the most gray square of pattern 190 of FIG. 5, no further adjustments are needed as to color balance. Continuing on to block 114 shown in FIG. 2, the print command for outputting the test pattern 190/sheet 180 is re-executed according to block 114, and examined for print defects according to block 116. If print defects do not exist, the procedure reverts to block 124 shown on FIG. 1 and continues as previously described. If print defects do exist, an operator returns the adjusted settings to the last good set point according to block 118, and the best possible color balance is achieved according to block 120.

Returning to decision block 110 of system 100 shown in FIG. 1, if a residual image problem does not exist as shown in decision block 110. (A residual image problem is a situation in which, rather than incorrectly printing maladjusted colors, a printer cleaning problem (photoreceptor, intermediate transfer roller/belt, or other source) results in residual toner/ink appearing in otherwise accurate color balance test patches of FIG. 5.) Continuing with FIG. 1, the user must next decide if saturated solid areas and bold text are desired, as per decision block 122. (See printed text 188 or FIG. 5 for this evaluation.) If saturated solid areas and bold text are indeed desired, the positive color adjustments to correct to the selected neutral gray patch, shown on the FIG. 5 pattern 190 with "+" signs, are performed according to block 124. Again, in each adjustment case based on FIG. 5, outer ring 194 corresponds to the need for higher order adjustments (such as the "(++)" or "(—)" indications), while inner ring 196 corresponds to the need for lower order adjustments (such as the "(+)" or "(–)" indications). Whenever "Gray Target" 192 is the most gray square of pattern 190 of FIG. 5, no further adjustments are needed as to color balance.

Figure 2:
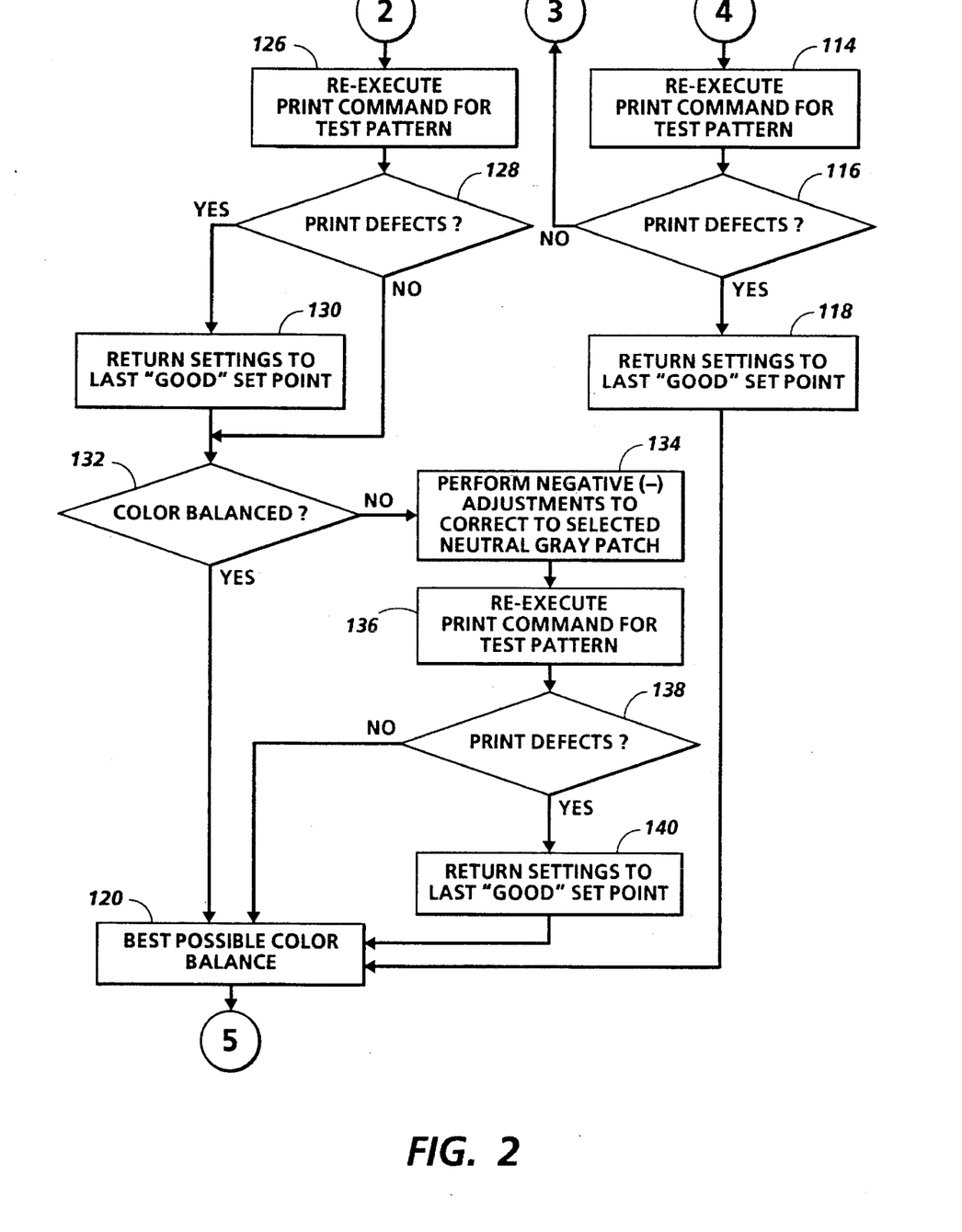
FIG. 2 is a continuation of the FIG. 1 flowchart.

With continued reference to system 100 following block 124, now on FIG. 2, the print test sheet 180 command is re-executed according to block 126 to determine if any print defects exist. If print defects according to decision block 128 do exist, the operator returns the adjusted settings to the last good set point adjustment, according to block 130. In either case whether decision block 128 print defects exist or not, if the color is balanced at this point (block 132), the best possible color balance is achieved (block 120). If the color is not balanced according to decision block 132, negative adjustments to correct to the selected neutral gray patch are performed according to block 134, and the print command to output the test pattern is again executed according to block 136. If print defects still exist according to block 138, the operator returns the settings to the last good set point; in either case whether print defects still exist or not according to block 138, the best possible color balance is achieved (block 120).

Figure 3:
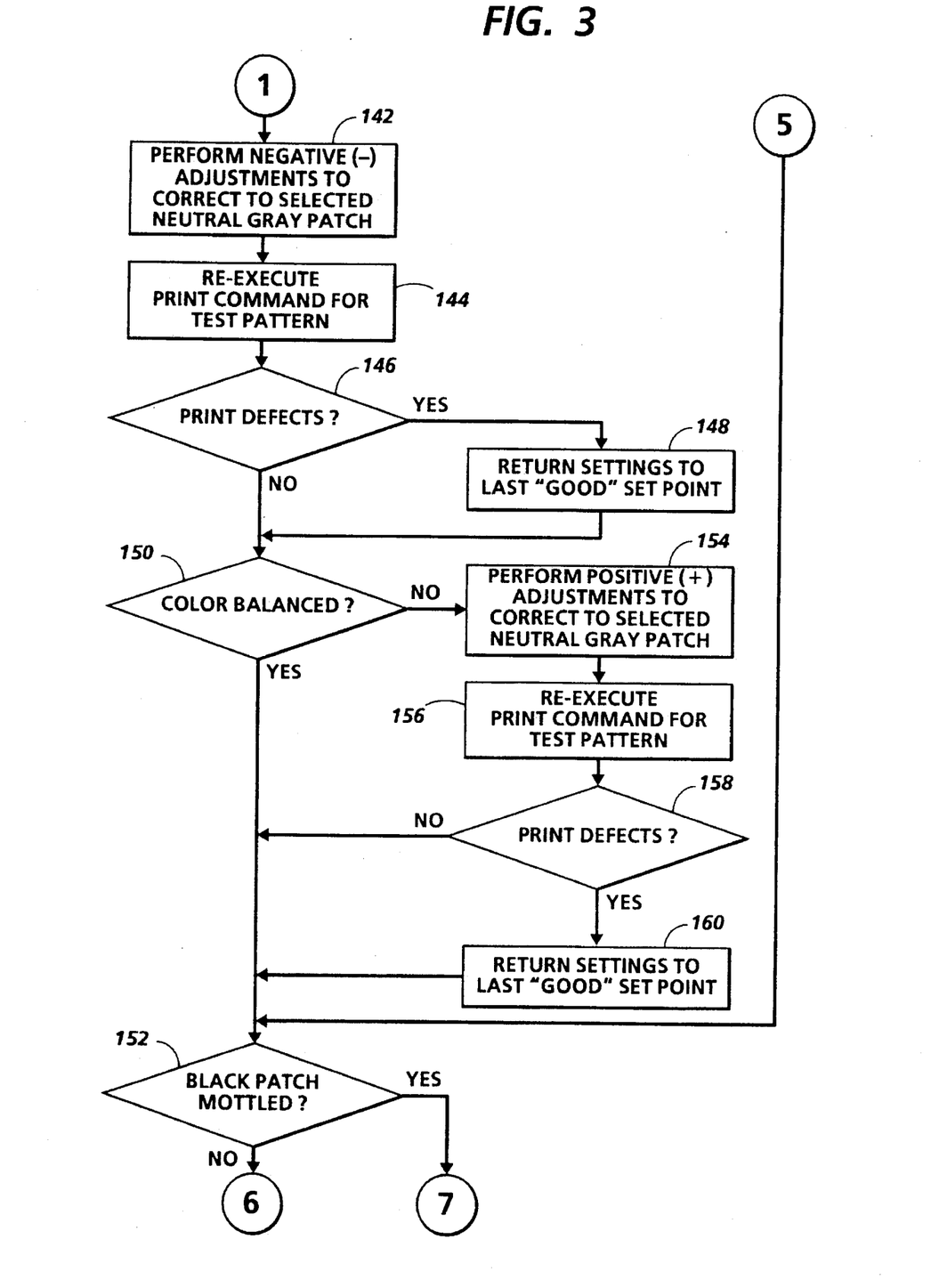
FIG. 3 is a continuation of the FIG. 2 flowchart.
Figure 4:
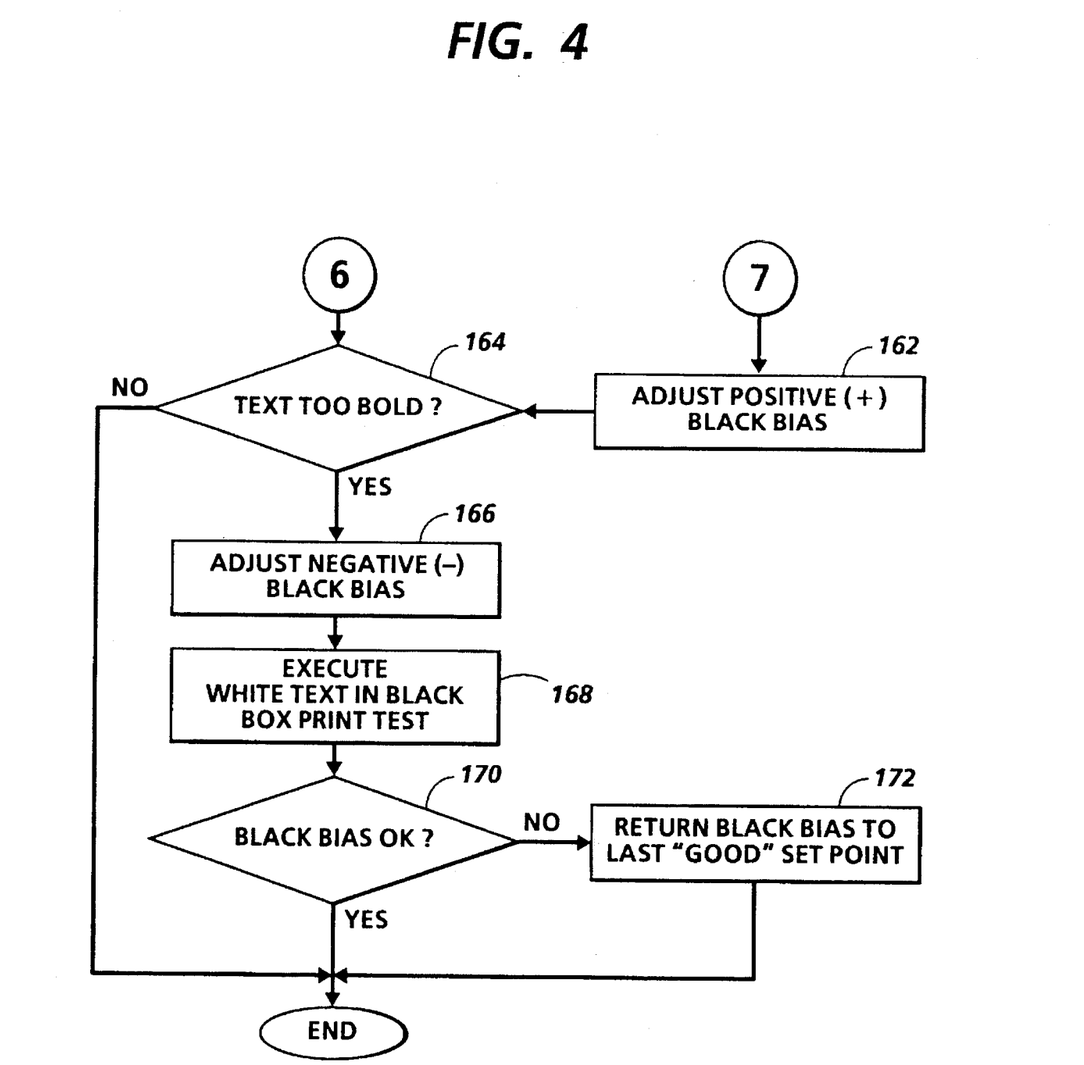
FIG. 4 is a continuation of the FIG. 3 flowchart.

Returning to decision block 122 of system 100 in FIG. 1, if the saturated solid areas and bold text is not desired (text 188 of FIG. 5), then according to block 142 of FIG. 3, the operator performs negative adjustments to correct to the selected neutral gray patch of the FIG. 5 test pattern 190. Thereafter, the user re-executes the print command to output the test pattern according to block 144, and examines the test pattern for print defects according to block 146. If print defects exist, the operator returns the adjustment settings to the last good set point (block 148); in either case the user examines whether the color of the test pattern is balanced according to block 150. If the color is not balanced, the operator performs positive adjustments to correct to selected neutral gray patch (block 154), and re-executes the print command for the FIG. 5 test pattern 190 according to block 156 to examine for print defects according to decision block 158. If print defects exist, the operator returns the adjustment settings to the last good set point, according to block 160. At this point, the color balance aspects of system 100 are completed.

In each situation, the user may then proceed to evaluate the solid density patches 182, 184 and 186 of the printer test sheet 180. If, according to block 152, the black patch of the test pattern is mottled, according to block 162 of FIG. 4, the positive black bias is adjusted. If the black patch is not mottled (and after the positive black bias has been adjusted), if the text is too bold according to decision block 164, the negative black bias of the printer is adjusted according to block 166. Thereafter a white text in black box print test is executed according to block 168. (This test area on sheet 180 of FIG. 180 is not shown) If the black bias is still acceptable according to decision block 170, the system 100 adjustment procedure is completed. If the black bias is not acceptable, the adjustment of black bias in the printer is returned to the last good set point, according to decision block 162, at which time procedure of system 100 is completed.

Figure 6:
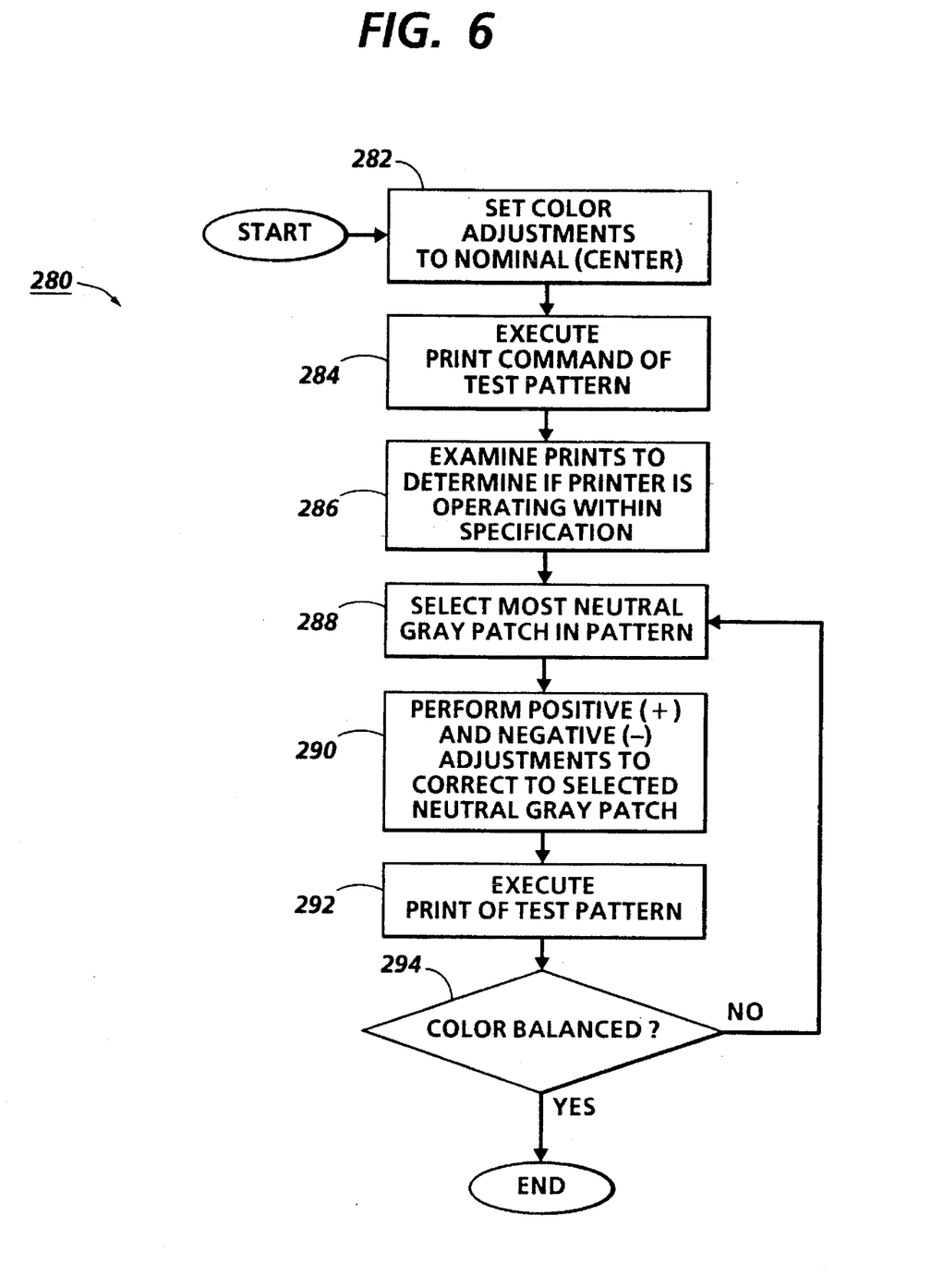
FIG. 6 is a block diagram showing another embodiment of a color balance system of the present invention.

FIG. 6 shows an abbreviated color adjustment system 280 of the present invention in which the examination of residual image problems (discussed above) are disregarded, irrelevant or not present in color balancing the printer. The adjustments performed according to system 280 are initiated by setting the color adjustments to a nominal or center position according to block 282. The operator then executes the print command to output the test pattern according to block 284. (The test pattern used is the same FIG. 5 test pattern 190 described in association with system 100 as shown in FIGS. 1 through 4.) Thereafter, according to block 286 of FIG. 6, the operator examines the print to determine if the printer is operating within specifications. According to block 288, the operator then selects the most neutral gray patch in the test pattern; thereafter according to block 290, the negative and positive adjustments called for at rings 194 and 196 to correct to selected neutral gray patch are performed. Thereafter the command to execute the print of the test pattern is again initiated according to block 292; thereafter the operator reviews the test pattern according to decision block 294 to determine if color is balanced. If color is balanced, the system 280 procedure is completed; if color is not balanced, the operator returns to block 288 of FIG. 6 to again perform the negative and positive adjustments to correct to the selected neutral gray patch as required, until color balance is attained.

Figure 7:
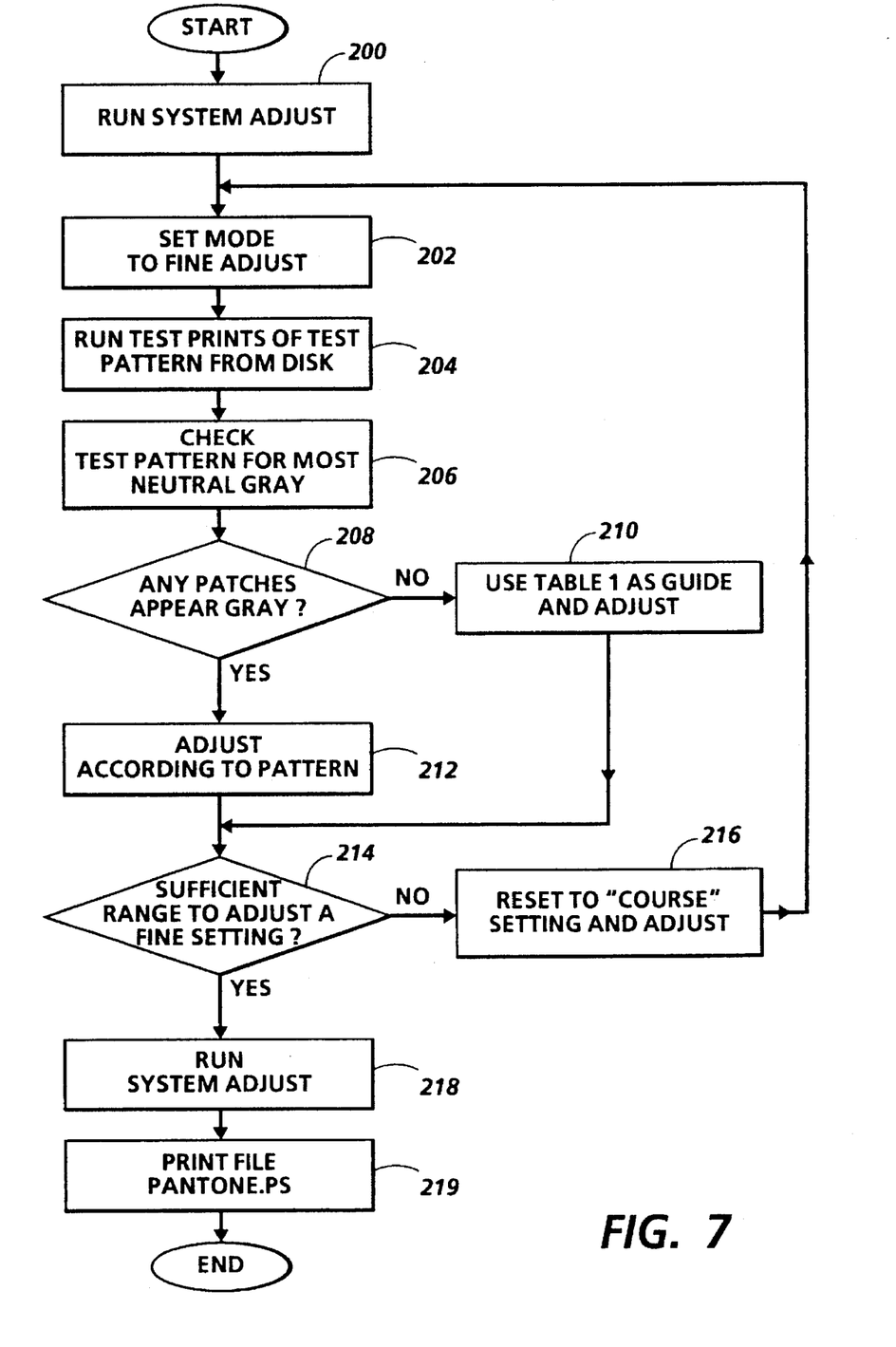
FIG. 7 is a block diagram showing another embodiment of a color balance system of the present invention.

FIG. 7 shows another system of the present invention for adjusting high density color balance or low density color balance in a copier and/or printer. The particular embodiment shown in FIG. 7 may be employed to adjust printer color balance; with certain modifications as will be detailed below, this same (or similar) procedure may also be used to adjust high and low copier density color balance.

Figure 9:
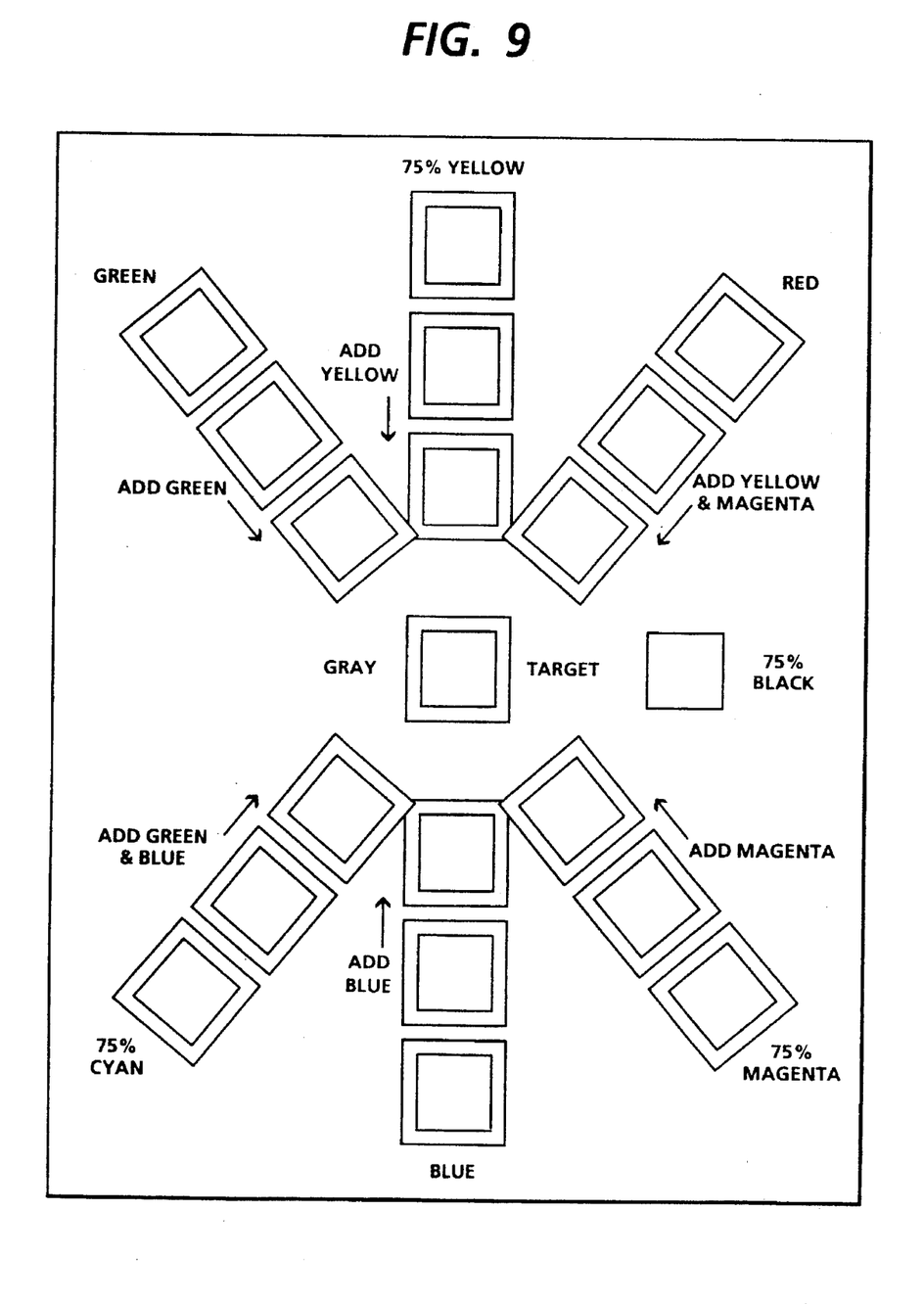
FIG. 9 is an elevational view showing a color balance test output print of the present invention.
Figure 10:
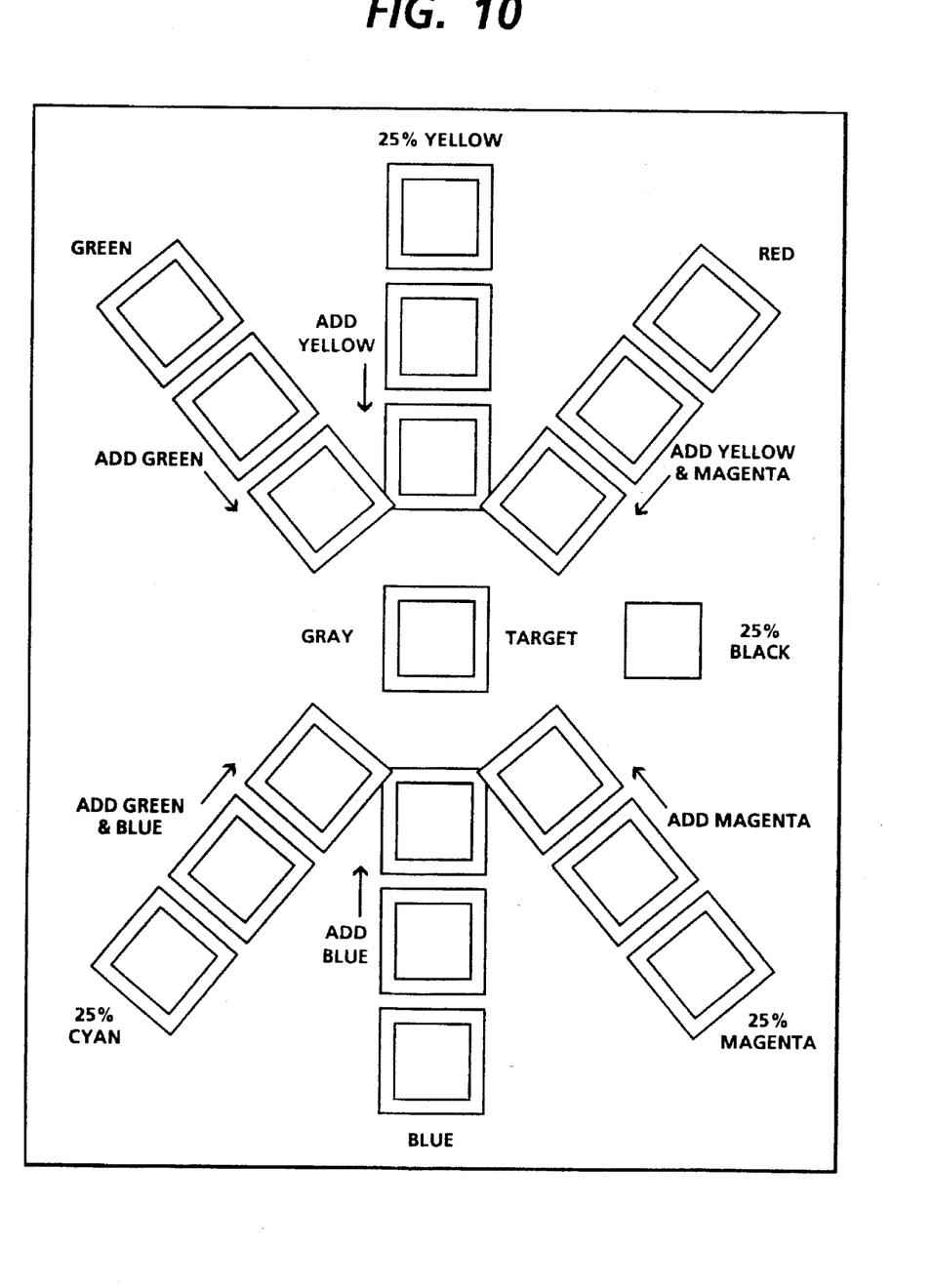
FIG. 10 is an elevational view showing a color balance test output print of the present invention.

According to block 200 of FIG. 7, "run system adjust" is initiated to begin the color balance procedure. According to block 202, the adjustment mode is set to fine adjust; thereafter a test print or set of test prints is run from the disk, such as the FIG. 9 (high density) and FIG. 10 (low density) test patterns. (The test pattern 220 shown in FIG. 8 is particularly useful for color copier balance adjustments, although it might also be used to adjust a color printer.) FIG. 9 shows the color printer high density test pattern, which indicates the adjustments that should be made in accordance with FIG. 7 to reach the desired center gray target. While a 75% density is shown in the test pattern of FIG. 9, other density levels above 50% might also be used. FIG. 10 shows the printer output for the low density color balance adjustment to reach the desired center gray target. While a 25% density level is selected, other levels below 50% level might be usefully employed in other embodiments. For both high density (FIG. 9) or low density (FIG. 10) color adjust, according to block 206, the user checks the test pattern for the most neutral gray target found in any of the indicator patches. If none of the patches appears gray according to decision block 208, the operator uses Table 1 as a guide in making adjustments to reach the desired FIG. 9 or FIG. 10 center gray target, as follows:

TABLE 1

| IF THE CENTER SQUARE APPEARS: | IN DC920 LOW (OR HIGH) DENSITY BALANCE, ADD: |
| --- | --- |
| yellow | blue |
| blue | yellow |

TABLE 1-continued

| IF THE CENTER SQUARE APPEARS: | IN DC920 LOW (OR HIGH) DENSITY BALANCE, ADD: |
|---|---|
| green | magenta |
| magenta | green |
| red | green and blue |
| cyan | yellow and magenta |

If according to decision block 208 any of the patches appear to be gray, the operator proceeds adjust color balance. The user adjusts the grayest appearing patch towards the center Gray Target, according to the "Add [Color]" instructions along each azimuth of the multicolored FIG. 9 (high density) or FIG. 10 (low density) charts. If in the case of blocks 210 or 212, there is not sufficient range to adjust color balance according to FIGS. 9 or 10 on a fine setting according to decision block 214, the user resets to a course setting and adjusts accordingly, thereafter proceeding through the procedure again beginning with block 202. If there is sufficient range to adjust the gray settings to a fine setting, the user may run system adjust according to block 218 so as to complete the necessary adjustments in obtaining high density color balance. After the high density color balance adjustments are completed, the same procedure may be repeated in order to adjust low density color balance.

In the case of copier color balance adjustments (or a printer and scanner operating in a copier mode), rather than running a test pattern from a disk in order to perform the adjustment, a user may place a sample test pattern on a scanner platen of the copier in lieu of the step 204 as shown in FIG. 7, such as the test pattern 220 shown in FIG. 8, which is particularly useful for color copier balance adjustments. Test pattern 220 includes seven squares, each having a centered gray target in the center of each indicator patch. Color balance in a copier may be completed by following the same procedures as adjusting printer color balance, except a test pattern 220 is copied from the platen and used to adjust color balance. As shown in FIG. 8, if patch 222 and target 223 indicate the grayest appearing patch, no correction is needed and current color balance is accepted. If patch 224 and gray target 226 appear the most gray, the operator is instructed to add yellow in making the adjustment. If patch 228 and target 230 appear the most gray, the operator is to add green; if patch 234 and gray target 232 appear the most gray, the operator is to add equal amounts of green and blue; if patch 236 and gray target 238 appear the most gray, the operator is to add blue; if patch 240 and gray target 242 appear the most gray, the operator is to add magenta; and if patch 244 and gray target 246 appear the most gray, the operator is to add equal amounts of magenta and yellow.

Figure 11:
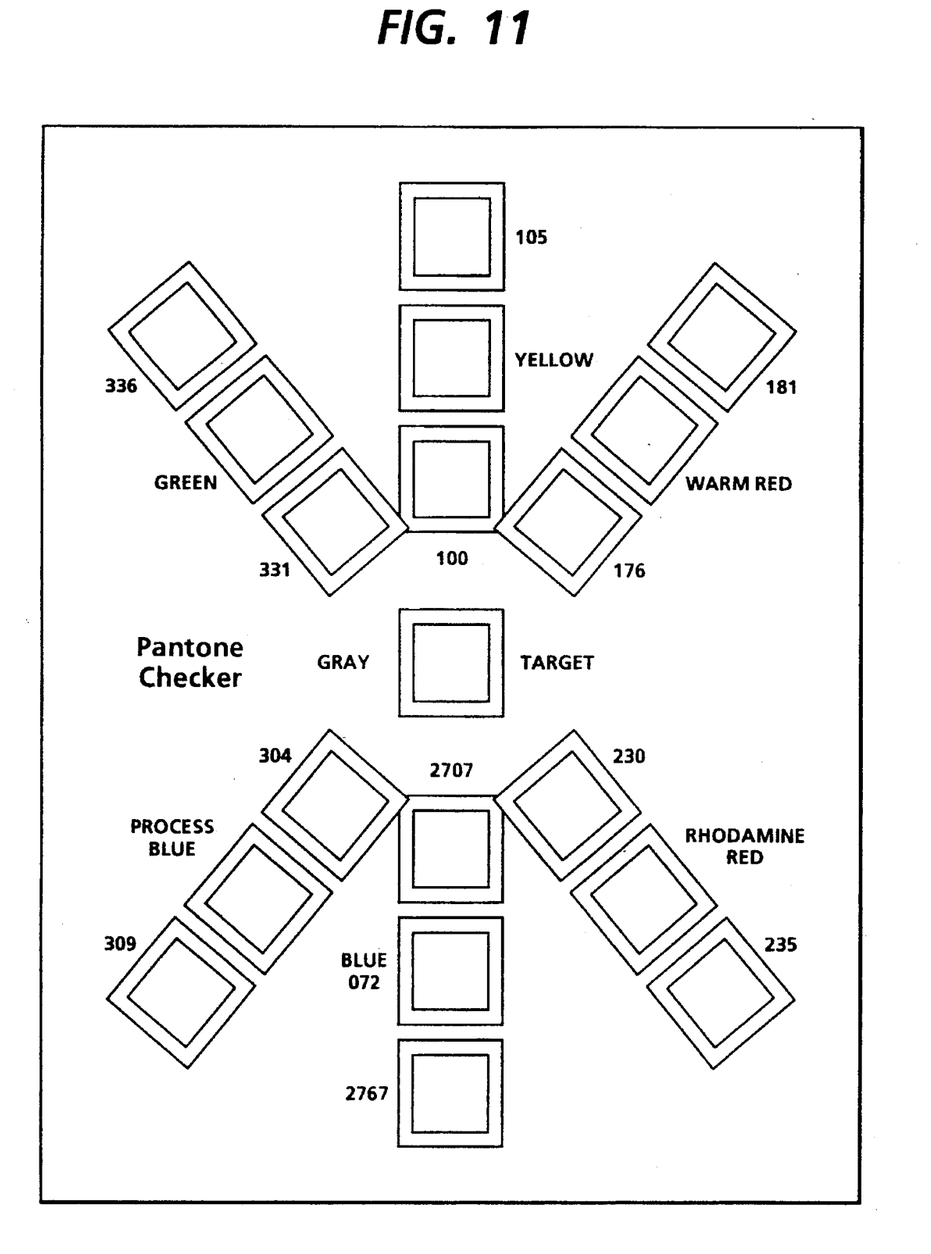
FIG. 11 is an elevational view showing a pantone color test output print of the present invention.

As shown by the block 219 "print file pantone.ps" step of FIG. 7, after copier and/or printer high and low density color balance adjustments are made, the operator may then print a "pantone checker" test pattern shown in FIG. 11, so that the accuracy of the printed (or copied) pantone colors indicated on FIG. 11 may be verified in the printer by comparing them to a pantone color table (not shown).

While present invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A printing system adapted to print multicolored indicia on sheets, comprising:

a processor, responsive to receiving a set of printer color balance adjustments, for providing a color balance judging indicator;

a controller for transmitting the set of printer color balance adjustments to said processor; and a print engine, associated with said processor, for printing a multicolored output sheet including a set of printer color balance adjustment instructions on performing color balance adjustments with said controller according to the color balance judging indicator, wherein the printer color balance adjustment instructions printed by said print engine includes a set of gradated color balance information for indicating a magnitude of the color balance adjustments to be performed.

2. A printing system adapted to print multicolored indicia on sheets, comprising:

a processor, responsive to receiving a set of printer color balance adjustments, for providing a color balance judging indicator, said processor being further responsive to receiving a set of printer gray balance adjustments, provides a gray balance judging indicator;

a controller for transmitting the set of printer color balance adjustments and the set of gray balance adjustments to said processor; and a print engine, associated with said processor, for printing a multicolored output sheet including a set of printer color balance adjustment instructions on performing color balance adjustments with said controller according to the color balance judging indicator and for printing a set of printer gray balance adjustment instructions for performing gray balance adjustments with said controller according to the gray balance judging indicator.

3. The printing system of claim 2, wherein the set of printer gray balance adjustment instructions printed by said print engine includes a set of gradated gray balance information for indicating a magnitude of the gray balance adjustments to be performed.

4. The printing system of claim 2, wherein the multicolored output sheet printed by said print engine includes a set of text samples for indicating a text quality output of said print engine.

5. The printing system of claim 2, wherein the multicolored output sheet printed by said print engine includes a set of solid image area samples for indicating a solid area density quality output of said print engine.

6. A printing system adapted to print multicolored indicia on sheets, comprising:

a processor, responsive to receiving a set of printer color balance adjustments, for providing a color balance judging indicator, wherein said processor includes an electronic data storage member for generating the color balance judging indicator;

a controller for transmitting the set of printer color balance adjustments to said processor; and a print engine, associated with said processor, for printing a multicolored output sheet including a set of printer color balance adjustment instructions on performing color balance adjustments with said controller according to the color balance judging indicator.

7. A printing system adapted to print multicolored indicia on sheets, comprising:

a processor, responsive to receiving a set of printer color balance adjustments, for providing a color balance judging indicator and a pantone color status indicator;

a controller for transmitting the set of printer color balance adjustments to said processor; and a print engine, associated with said processor, for printing a multicolored output sheet including a set of printer color balance adjustment instructions on performing color balance adjustments with said controller according to the color balance judging indicator, said print engine also printing a pantone checking color output sheet for indicating a pantone color quality output of said print engine.

8. A method for adjusting color and gray balance of a printing system adapted to print multicolored indicia on sheets, comprising:

obtaining a color balance judging indicator from a print engine;

outputting a multicolored sheet from the print engine, with the multicolored sheet including a set of printer color balance adjustment instructions on performing color balance adjustments to the print engine;

determining a magnitude of the color balance adjustments to be performed according to a set of gradated color balance information included on the multicolored sheet output by the print engine; and performing a set of color balance adjustments according to the set of printer color balance adjustment instructions.

9. A method for adjusting color and gray balance of a printing system adapted to print multicolored indicia on sheets, comprising:

obtaining a color balance judging indicator and a gray balance judging indicator from a print engine;

outputting a multicolored sheet from a print engine, with the multicolored sheet including a set of printer color balance adjustment instructions on performing color balance adjustments to the print engine and a set of gray balance adjustment instructions for performing gray balanced adjustments to the print engine; and performing a set of printer color balance adjustments according to the set of printer color balance adjustment instructions and a set of gray balance adjustments according to the set of printer gray balance instructions.

10. The method of claim 9, further comprising:

determining a magnitude of the gray balance adjustments to be performed according to a set of gradated gray balance information included on the multicolored sheet outputted by the print engine.

11. A method for adjusting color and gray balance of a printing system adapted to print multicolored indicia on sheets, comprising;

obtaining a color balance judging indicator from a print engine;

outputting a multicolored sheet from a print engine, with the multicolored sheet including a set of printer color balance adjustment instructions on performing color balance adjustments to the print engine;

performing a set of printer color balance adjustments according to the set of printer color balance adjustment instructions; and generating the color balance judging indicator from an electronic data storage member.

12. A method for adjusting color and gray balance of a printing system adapted to print multicolored indicia on sheets, comprising:

obtaining a color balance judging indicator from a print engine;

outputting a multicolored sheet from a print engine, with the multicolored sheet including a set of printer color balance adjustment instructions on performing color balance adjustments to the print engine and generating a set of text samples on the multicolored sheet for indicating a text quality output of the print engine; and performing a set of printer color balance adjustments according to the set of printer color balance adjustment instructions.

13. A method for adjusting color and gray balance of a printing system adapted to print multicolored indicia on sheets, comprising:

obtaining a color balance judging indicator from a print engine;

outputting a multicolored sheet from the print engine, with the multicolored sheet including a set of printer color balance adjustment instructions on performing color balance adjustments to the print engine;

performing a set of color balance adjustments according to the set of printer color balance adjustment instructions; and generating a pantone checker color output sheet for indicating a pantone quality output of the print engine.

* * * * *